(12) United States Patent
Mehta

(10) Patent No.: US 8,845,981 B2
(45) Date of Patent: Sep. 30, 2014

(54) BIOLOGIC FLUID ANALYSIS CARTRIDGE WITH VOLUMETRIC SAMPLE METERING

(71) Applicant: Abbott Point of Care, Inc., Princeton, NJ (US)

(72) Inventor: Manav Mehta, Plainsboro, NJ (US)

(73) Assignee: Abbott Point of Care, Inc., Princeton, NJ (US)

( * ) Notice: Subject to any disclaimer, the term of this patent is extended or adjusted under 35 U.S.C. 154(b) by 42 days.

(21) Appl. No.: 13/729,813

(22) Filed: Dec. 28, 2012

(65) Prior Publication Data

US 2013/0167945 A1  Jul. 4, 2013

Related U.S. Application Data

(60) Provisional application No. 61/580,919, filed on Dec. 28, 2011.

(51) Int. Cl.
*B01L 3/00* (2006.01)
*F16K 17/40* (2006.01)

(52) U.S. Cl.
CPC ......... *F16K 17/40* (2013.01); *B01L 2200/0605* (2013.01); *B01L 3/5027* (2013.01); *B01L 2400/0406* (2013.01); *B01L 3/502738* (2013.01); *B01L 2400/0688* (2013.01); *Y10S 435/808* (2013.01); *Y10S 436/805* (2013.01); *Y10S 436/809* (2013.01)
USPC ....... 422/504; 422/52; 422/82.05; 422/82.06; 422/82.07; 422/82.08; 422/82.09; 422/82.11; 422/407; 422/500; 422/501; 422/502; 422/503; 422/930; 435/164; 435/165; 435/283.1; 435/287.1; 435/287.2; 435/288.7; 435/808; 435/4; 435/5; 435/7.2; 435/7.9; 436/52; 436/53; 436/164; 436/165; 436/172; 436/174; 436/518; 436/524; 436/525; 436/526; 436/805; 436/809

(58) Field of Classification Search
USPC ............... 422/52, 82.05, 82.06, 82.07, 82.08, 422/82.09, 82.11, 407, 500, 501, 502, 503, 422/504, 930; 435/164, 165, 283.1, 287.1, 435/287.2, 288.7, 808, 4, 5, 7.2, 7.9; 436/52, 53, 164, 165, 172, 174, 518, 436/524, 525, 526, 805, 809
See application file for complete search history.

(56) References Cited

U.S. PATENT DOCUMENTS

| | | | |
|---|---|---|---|
| 6,632,399 | B1 | 10/2003 | Kellogg et al. |
| 6,866,823 | B2 | 3/2005 | Wardlaw |
| 2011/0244581 | A1 | 10/2011 | Nikonorov |
| 2012/0034647 | A1 | 2/2012 | Herzog |

FOREIGN PATENT DOCUMENTS

| | | |
|---|---|---|
| EP | 0215419 | 3/1987 |
| WO | 9317328 | 9/1993 |
| WO | 2009099512 | 8/2009 |

OTHER PUBLICATIONS

International search report for PCT/US2012/072028 dated Mar. 6, 2013.

(Continued)

*Primary Examiner* — Dennis M White
(74) *Attorney, Agent, or Firm* — O'Shea Getz P.C.

(57) ABSTRACT

A device for volumetric metering a liquid biologic sample is provided. The device includes an initial chamber, a second chamber, a third chamber, a first valve, a second valve and a third valve. The chambers are each configured so that liquid sample disposed in the respective chamber is subject to capillary forces. Each chamber has a volume, and the volume of the initial chamber is greater than the volume of either the second or the third chambers. The valves each have a burst pressure. The burst pressure of the first valve is greater than the third burst pressure. The first valve is in fluid communication with the second chamber. The second valve is disposed between, and is in fluid communication with, the initial chamber and the third chamber. The third valve is in fluid communication with the third chamber.

15 Claims, 3 Drawing Sheets

(56) References Cited

OTHER PUBLICATIONS

Egidi et al. "Fabrication and Characterization of Stop Flow Valves for Fluid Handling", Transducer '03, The 12th International Conference on Solid State Sensors, Actuators and Microsystems, Jun. 8-12, 2003, pp. 147-150.

Daniel Irimia "Capillary Force Valves", Encyclopedia of Microfluidics and Nanofluidics, 2008, pp. 192-196.

BIOLOGIC FLUID ANALYSIS CARTRIDGE WITH VOLUMETRIC SAMPLE METERING

The present application is entitled to the benefit of and incorporates by reference essential subject matter disclosed in the U.S. Provisional Patent Application Ser. No. 61/580,919, filed Dec. 28, 2011.

BACKGROUND OF THE INVENTION

1. Technical Field

The present invention relates to apparatus for acquiring, processing, and containing biologic fluid samples for analysis in general, and to apparatus for metering a known volume of biologic fluid in particular.

2. Background Information

Historically, biologic fluid samples such as whole blood, urine, cerebrospinal fluid, body cavity fluids, etc., have had their particulate or cellular contents evaluated by smearing a small undiluted amount of the fluid on a slide and evaluating that smear under a microscope. Reasonable results can be gained from such a smear, but the cell integrity, accuracy and reliability of the data depends largely on the technician's experience and technique.

In some instances, constituents within a biological fluid sample can be analyzed using impedance or optical flow cytometry. These techniques evaluate a flow of diluted fluid sample by passing the diluted flow through one or more orifices located relative to an impedance measuring device or an optical imaging device. A disadvantage of these techniques is that they require dilution of the sample, and fluid flow handling apparatus.

What is needed is a method and apparatus for metering a known volume of biologic fluid, one that does not require moving parts (e.g., one that can operate using capillary forces), one that is easy to manufacture, and one that is cost-effective.

SUMMARY OF THE INVENTION

According to an aspect of the present invention, a device for volumetric metering a liquid biologic sample is provided. The device includes an initial chamber, a second chamber, a third chamber, a first valve, a second valve and a third valve. The chambers are each configured so that liquid sample disposed in the respective chamber is subject to capillary forces. Each chamber has a volume, and the volume of the initial chamber is greater than the volume of either the second or the third chambers. The valves each have a burst pressure. The burst pressure of the first valve is greater than the third burst pressure. The first valve is in fluid communication with the second chamber. The second valve is disposed between, and is in fluid communication with, the initial chamber and the third chamber. The third valve is in fluid communication with the third chamber.

According to another aspect of the present invention, an analysis cartridge for a liquid biologic sample is provided. The cartridge includes a collection port, an analysis chamber, and at least one volume reduction stage. The volume reduction stage includes an initial chamber, a second chamber, a third chamber, a first valve, a second valve and a third valve. The chambers are each configured so that liquid sample disposed in the respective chamber is subject to capillary forces. Each chamber has a volume, and the volume of the initial chamber is greater than the volume of either the second or the third chambers. The valves each have a burst pressure. The burst pressure of the first valve is greater than the third burst pressure. The first valve is in fluid communication with the second chamber. The second valve is disposed between, and is in fluid communication with, the initial chamber and the third chamber. The third valve is in fluid communication with the third chamber. The volume reduction stage is in fluid communication with the collection port and the analysis chamber. The stage is disposed such that sample entering the cartridge through the collection port passes through the volume reduction stage, and exits the third valve prior to entering the analysis chamber.

The features and advantages of the present invention will become apparent in light of the detailed description of the invention provided below, and as illustrated in the accompanying drawings.

DETAILED DESCRIPTION OF THE INVENTION

The present invention includes a device for volumetrically metering a liquid sample, and is described below in the context of a biologic fluid analysis cartridge that includes a sample collection port and an analysis chamber. The analysis chamber is configured to receive and hold a volume of biologic sample quiescently to allow the sample to be imaged, which image can subsequently be analyzed. In terms of a sample of substantially undiluted whole blood, analyses that can be performed using the imaged sample include complete blood count, white blood cell differential, platelet count, etc. A person of skill in the art will recognize the significance of being able to gather such diverse and complete information from a single sample. One of the challenges associated with acquiring a sample for imaging is being able to accurately reduce an initial volume of liquid sample (e.g., collected directly from a subject) down to a volume sized for analysis (e.g., a volume that can be easily handled and imaged within an analysis chamber).

The present invention liquid volume reduction is operable to accurately reduce the volume of an initial sample to a predetermined volume. More than one volume reduction stage can be placed in series to provide volume reductions for various different applications. One or more of the volume reduction stages can be selectively chosen to produce a desired reduction in volume with no required external force applied to the sample.

Figure 1:
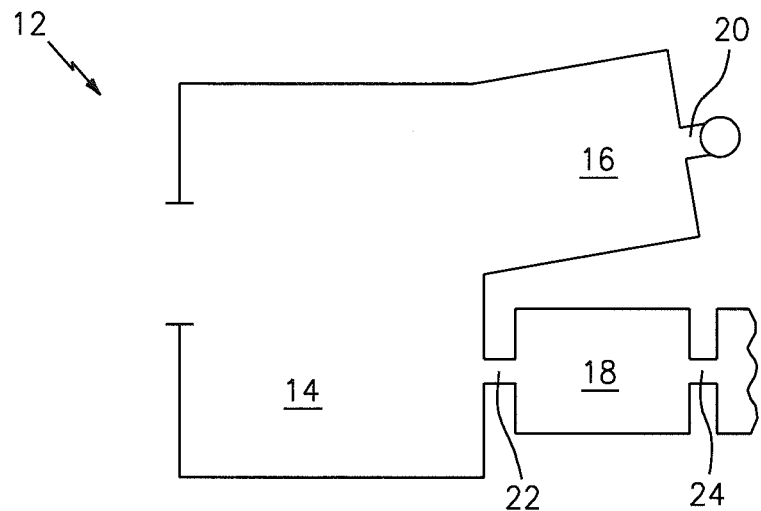
FIG. 1 is a diagrammatic illustration of a liquid volume reduction stage.

FIG. 1 diagrammatically illustrates a single volume reduction stage version of the present invention. The single reduction stage 12 includes an initial chamber 14, a second chamber 16, a third chamber 18, a first capillary valve 20, a second capillary valve 22, and a third capillary valve 24. The initial chamber 14, second chamber 16, and third chamber 18 each have a known volume and each has a cross-sectional geometry that permits capillary forces to act on liquids disposed therein. The combined volumes of the second and third chambers 16, 18 typically equal the volume of the initial chamber 14. For example, if the initial chamber 14 has a volume of X, then the second chamber may have a volume of 0.75X and the third chamber may have a volume of 0.25X. The second chamber 16 and third chamber 18 each are in fluid communication with the initial chamber 14. The term "fluid communication" is used to mean that a liquid passage exists between the structures, or out of a particular structure, although such passage may include one or more flow inhibitors. The first capillary valve 20 is in fluid communication with the second chamber 16. The second capillary valve 22 is disposed between, and is in fluid communication with, the initial chamber 14 and the third chamber 18. The third capillary valve 24 is in fluid communication with the third chamber 18. The second chamber 16 is configured such that liquid sample disposed in the second chamber 16 is subjected to greater capillary forces than liquid sample disposed in the initial chamber 14. The third chamber 18 is configured such that liquid sample disposed in the third chamber 18 is subjected to greater capillary forces than liquid sample disposed in the second chamber 16.

The valves 20, 22, 24 are not limited to any particular type of fluid control structure. For example, the capillary valves 20, 22, 24 may be characterized as "burst valves" that allow liquid flow there through when subjected to liquid at a predetermined pressure value. This may also be described in terms of a difference in pressure ("DP") across the valve; e.g., if the DP across the valve is great enough, flow will be permitted through the valve. Several factors are relevant when considering the pressure drop across a capillary valve. For example, in an embodiment wherein the capillary valve is cylindrical (radius="R") and has a length ("L"), the viscosity, temperature, and surface tension of the fluid are among the factors to be considered. An example of an acceptable capillary valve is one that includes a local passage having a diameter sized such that surface tension of a liquid encountering the passage will at least prevent the liquid from entering the passage until the liquid reaches a predetermined pressure; i.e., the "burst pressure". The term "burst pressure" refers to the minimum pressure required to act on the meniscus of a liquid at the capillary valve before flow is permitted through the valve. The pressure at the liquid meniscus must be equal to or greater than the "burst pressure" in order for the liquid to pass through the capillary valve. The burst pressure of the first capillary valve 20 is greater than the burst pressures of both the second capillary valve 22 and the third capillary valve 24.

Sample will be drawn out of the initial chamber and into the second chamber by capillary force. The burst pressure of the first capillary valve 20 is selected to be greater than the pressure of a meniscus of a liquid sample at the first capillary valve 20 due to capillary forces acting on the sample within the second chamber. The burst pressure of the second capillary valve 22 (disposed between the initial chamber and the third chamber) is less than that of the first capillary valve 20, however, and is low enough such that remainder of the sample residing within the initial chamber 14 not drawn into the second chamber 16 will be drawn out of the initial chamber 14, through the second capillary valve 22 and into the third chamber 18. Note that because the fluid path into the second chamber 16 does not have the flow resistance associated with the second capillary valve 22, the second chamber will fill prior to the sample that subsequently passes through the second capillary valve 22 and into the third chamber 18. In terms of the example above, if the initial chamber 14 holds X volume of sample and 0.75X of sample volume is drawn into the second chamber 16, then the remaining 0.25X sample volume is drawn into the third chamber 18. The burst pressure of the third capillary valve 24 is less than that of the second capillary valve 22, and is low enough such that the sample residing within the third chamber 18 will be drawn out of the third chamber 18, through the third capillary valve 24, and into an analysis chamber (or other structure) disposed on the opposite side of the third capillary valve 24. Hence, an accurate volume of sample (i.e., 0.25X) is separated from the initial volume of sample and is delivered to a structure downstream of the third capillary valve 24; e.g., an analysis chamber.

Figure 2:
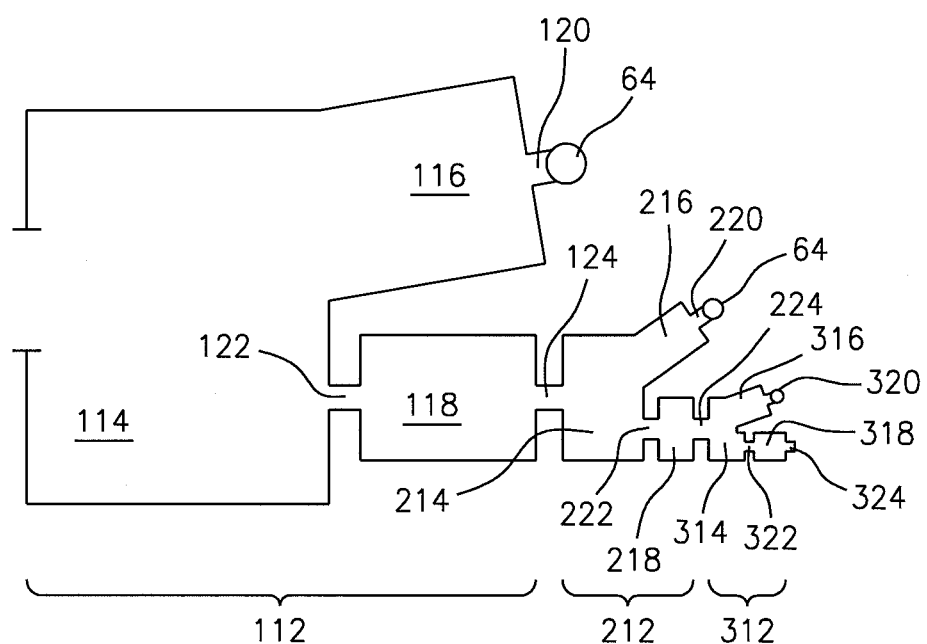
FIG. 2 is a diagrammatic illustration of a plurality of volume reduction stages in series.
Figure 3:
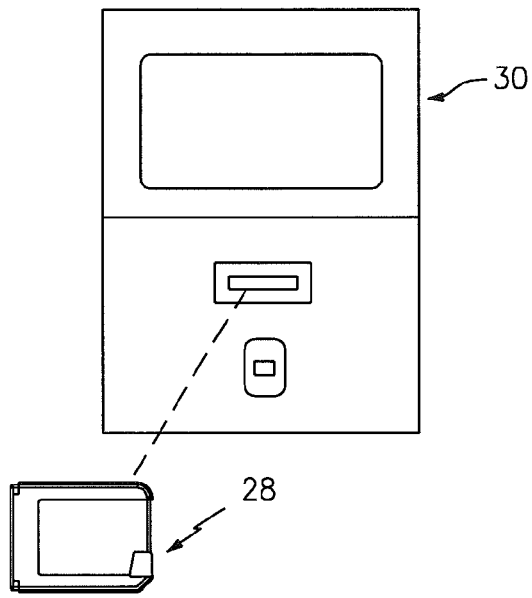
FIG. 3 is a diagrammatic view of a biologic fluid analysis device.

FIG. 2 diagrammatically illustrates an embodiment of the present invention having multiple volume reduction stages in series with one another; e.g., a first volume reduction stage 112, a second volume reduction stage 212, and a third volume reduction stage 312. The present invention is not limited to any particular number of volume reduction stages, however.

The first volume reduction stage 112 includes an initial chamber 114, a second chamber 116, a third chamber 118, a first capillary valve 120, a second capillary valve 122, and a third capillary valve 124. The chambers 114, 116, 118 and capillary valves 120, 122, 124 are configured in the manner described above in the single reduction stage embodiment. In this embodiment, however, the third capillary valve 124 is disposed between the third chamber 118 of the first reduction stage 112 and the initial chamber 214 of the second volume reduction stage 212.

The second volume reduction stage 212 includes an initial chamber 214, a second chamber 216, a third chamber 218, a first capillary valve 220, a second capillary valve 222, and a third capillary valve 224. The chambers 214, 216, 218 and capillary valves 220, 222, 224 are configured in the manner as described above in the single reduction stage embodiment. The burst pressures of the capillary valves 220, 222, 224 in the second stage 212 are typically less, however, than those within of the initial stage valves 120, 122, 124. Also, in this embodiment the third capillary valve 224 is disposed between the third chamber 218 of the second reduction stage 212 and the initial chamber 314 of the third volume reduction stage 312.

The third volume reduction stage 312 includes an initial chamber 314, a second chamber 316, a third chamber 318, a first capillary valve 320, a second capillary valve 322, and a third capillary valve 324. The chambers 314, 316, 318 and capillary valves 320, 322, 324 are configured in the manner described above in the single reduction stage embodiment. The burst pressures of the capillary valves 320, 322, 324 in the third stage 312 are typically less, however, than those within of the initial and second stage valves 120,122,124,220,222, 224. Also, in this embodiment the third capillary valve 324 is disposed between the third chamber 318 of the second reduction stage 312 and a subsequent chamber 414 (e.g., an analysis chamber).

In the operation of this embodiment, sample disposed within the initial chamber 114 of the initial volume reduction stage 112 will be drawn out of the initial chamber and into the second chamber 116 by capillary force. In the manner described above in the single reduction stage embodiment, the remainder of the sample residing within the initial chamber 114 not drawn into the second chamber 116 will be drawn through the second capillary valve 122 and into the third chamber 118. Capillary forces acting on the sample in the third chamber 118 will force the sample through the third capillary valve 124, and into the initial chamber 214 of the second volume reduction stage 212. In similar manner, the sample initially disposed within the initial chamber 214 (of the second reduction stage 212) not drawn into the second chamber 216 will be drawn through the second capillary valve 222 and into the third chamber 218. Capillary forces acting on the sample in the third chamber 218 will force the sample through the third capillary valve 224, and into the initial chamber 314 of the third volume reduction stage 312. Again in similar manner, the sample initially disposed within the initial chamber 314 (of the third reduction stage 312) not drawn into the second chamber 316 will be drawn through the second capillary valve 322 and into the third chamber 318. Capillary forces acting on the sample in the third chamber 318 will force the sample through the third capillary valve 324 and into a subsequent chamber 414 (e.g., an analysis chamber).

In terms of the example above, if the initial chamber 114 holds ten microliters (10 µl) of sample and seven and one-half microliters (7.5 µl) of sample volume is drawn into the second chamber 116 (which 7.5 µl is the volume of the chamber 116), then the remaining two and one-half microliters (2.5 µl) sample volume is drawn into the third chamber 118. Subsequently, the 2.5 µl is drawn into the initial chamber 214 of the second reduction stage 212. The volume of the second chamber 216 is one and seven-tenths microliters (1.7 µl). Consequently, 1.7 µl of sample are drawn into the second chamber 216 and the remaining eight-tenths microliters (0.8 µl) are drawn into the third chamber 218. From there, the 0.8 µl is drawn into the initial chamber 314 of the third reduction stage 312. The second chamber 316 has a volume of four-tenths microliters (0.4 µl). Consequently, 0.4 µl of sample are drawn into the second chamber 316 and the remainder four-tenths microliters (0.4 µl) are drawn into the third chamber 318 and passed through the third capillary valve 324 and delivered to a structure downstream of the third capillary valve 324; e.g., an analysis chamber. Hence, the original ten microliters (10 µl) of sample is accurately reduced to four-tenths microliter (0.4 µl) without the need for mechanical or electrical valves, or a pressure source, or independent structure for measuring the final volume. The four-tenths microliter (0.4 µl) volume is an acceptable sample volume for disposition within the analysis chamber where it can be imaged and analyzed. The above example is provided for illustrative purposes only and is not intended to limit the present invention is any way.

The present invention sample volume reduction structure can be utilized in a variety of different applications and structures. To illustrate the utility of the present invention, the structure is described below as part of a particular sample analysis cartridge embodiment that is operable to receive a biologic fluid sample such as a whole blood sample or other biologic fluid specimen. The present invention is not limited to use with an analysis cartridge, and therefore not with this specific type of analysis cartridge. Referring to FIGS. 3-6, the cartridge 28 is a part of an automated analysis system that includes the cartridge 28 and an automated analysis device 30.

Figure 4:
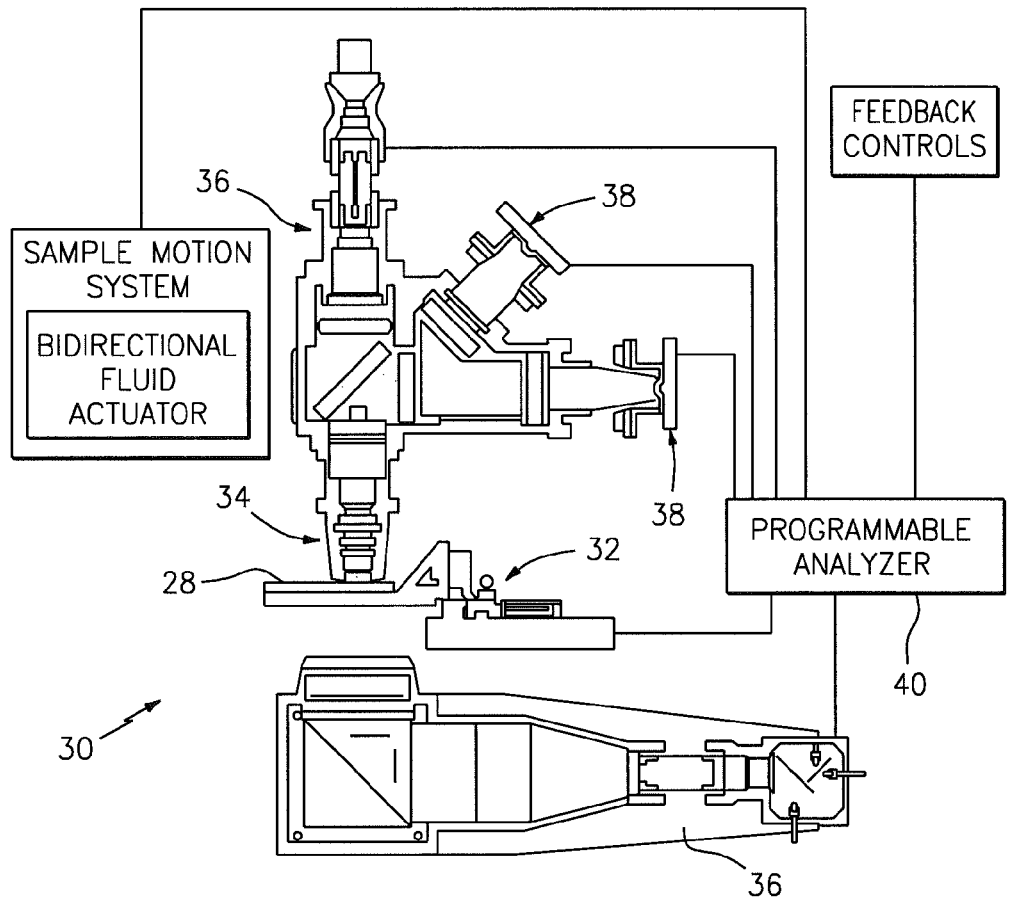
FIG. 4 is a diagrammatic illustration of a biologic fluid analysis device.

FIG. 4 is a diagrammatic illustration of an analysis device 30 that includes a cartridge positioner 32, a sample objective lens 34, a plurality of sample illuminators 36, an image dissector 38, and a programmable analyzer 40. One or both of the objective lens 34 and cartridge holding device 28 are movable toward and away from each other to change a relative focal position. The sample illuminators 36 illuminate the sample using light along predetermined wavelengths. Light transmitted through the sample, or fluoresced from the sample, is captured using the image dissector 38, and a signal representative of the captured light is sent to the programmable analyzer 40, where it is processed into an image. The imaging hardware (e.g., objective lens, sample illuminators, image dissector, etc.) described in U.S. Pat. No. 6,866,823 and U.S. patent application Ser. No. 13/204,415 (each of which is hereby incorporated by reference in its entirety) are acceptable types of imaging hardware for the present analysis device 30. The present invention is not limited to use with the aforesaid imaging hardware, however. The programmable analyzer 40 includes a central processing unit (CPU) and is in communication with the cartridge positioner 32, the sample illuminators 36, and the image dissector 38. The CPU is adapted (e.g., programmed) to receive the signals and selectively perform the functions necessary to operate the cartridge positioner 32, the sample illuminator 36, the image dissector 38.

Figure 5:
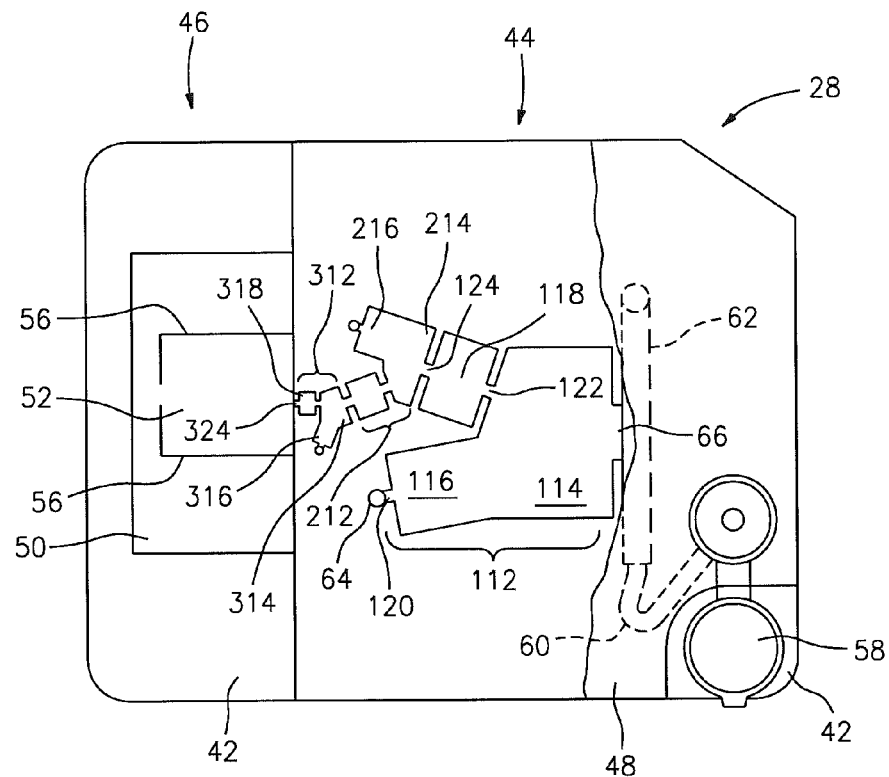
FIG. 5 is a partially sectioned top view of a cartridge embodiment operable to be used with the analysis device shown in FIG. 4.
Figure 6:
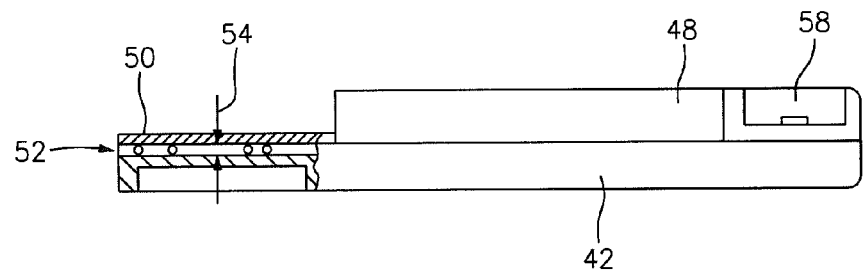
FIG. 6 is a partially sectioned side view of a cartridge embodiment operable to be used with the analysis device shown in FIG. 4.

An embodiment of the cartridge 28 is fully described in U.S. Patent Application No. 61/470,142, which is hereby incorporated by reference in its entirety. FIGS. 5 and 6 illustrate an embodiment of the aforesaid cartridge 28 that includes a base plate 42 that extends between a sample handling portion 44 and an analysis chamber portion 46. A handling upper panel 48 is attached to the base plate 42 in the sample handling portion 44, and a chamber upper panel 50 is attached to the base plate 42 in analysis chamber portion. A sealing material may be disposed between the base plate 42 and the respective handling upper panel 48 and chamber upper panel 50. The cartridge 28 shown in FIGS. 5 and 6 is depicted as a unitary structure where the sample handling portion 44 and the analysis chamber portion 46 are fixed to one another. In alternative embodiments, the sample handling portion 44 and the analysis chamber portion 46 may be selectively attachable and detachable from one another; e.g., two independent portions that can be combined. For instance, in a two piece configuration the separable sample handling portion 44 can be used at the collection site, and then can be subsequently attached to an analysis chamber portion 46 (or to different types of analysis chamber portions).

The analysis chamber portion 46 of the cartridge 28, formed by a portion of the base plate 42 and the chamber upper panel 50, includes at least one analysis chamber 52 in fluid communication with the volume reduction device. The analysis chamber 52 is formed between the opposing surfaces (i.e., the "chamber interior surfaces") of the base plate and the chamber upper panel 50, at least one of which is transparent. Within the analysis chamber 52, the interior surfaces of the base plate 42 and the chamber upper panel 50 are spaced apart from one another and are configured to receive a fluid sample there between for image analysis. The distance between the opposing interior surfaces of the two panels (i.e., the "chamber height 54") is such that a biologic fluid sample disposed between the two surfaces will contact both surfaces. The analysis chamber 52 is further defined by lateral boundaries 56 that contain the lateral spread of the sample between the interior surfaces; e.g., a lateral boundary 56 may be formed by a hydrophobic coating, a bead of adhesive, etc. Within the portion of the analysis chamber 52 where sample is imaged, the interior surfaces are typically, but not necessarily, substantially parallel one another.

The analysis chamber 52 is typically sized to hold about 0.2 to 1.0 micro liters of sample, but the chamber 52 is not limited to any particular volume capacity, and the capacity can vary to suit the analysis application. The chamber 52 is operable to quiescently hold a liquid sample. The term "quiescent" is used to describe that the sample is deposited within the chamber 52 for analysis, and is not purposefully moved during the analysis. To the extent that motion is present within the blood sample, it will predominantly be due to Brownian motion of the blood sample's formed constituents, which motion is not disabling of the use of this invention.

The sample handling portion 44 of the cartridge 28 includes a collection port 58, an initial channel 60, a secondary channel 62, and one or more sample volume reduction stages 112, 212, 312. The handling upper panel 48 includes the collection port 58 for receiving a fluid sample. The collection port 58 is configured to accept a fluid sample from a container (e.g., a needle, etc.) or from a surface source (e.g., a finger prick). The port 58 holds enough sample for the application at hand; e.g., for a blood sample analysis, a port volume of approximately thirty microliters (30 µl) typically will be adequate.

The channels 60, 62 and sample volume reduction stage 12 are formed in one of the base plate 42, or handling upper panel 48, or collectively formed by both of them. The initial channel 60 is in fluid communication with the collection port 58 and is sized to draw a portion of the sample (e.g., twenty microliters—20 µl) out of the collection port 58 by capillary force and/or gravity. The secondary channel 62 is in fluid communication with the initial channel 60, and is downstream of the initial channel 60. The secondary channel 62 is in fluid communication with the first volume reduction device 112. The volume reduction stages 112, 212, 312 are disposed between the secondary channel 62 and the analysis chamber 52.

In the embodiment shown in FIG. 5, the volume reduction stages include a first volume reduction stage 112, a second volume reduction stage 212, and a third volume reduction stage 312. Each reduction stage is configured in the manner similar to that described above and shown in FIG. 2. In addition, the first capillary valve 120, 220, 320 of each stage is connected to a vent 64 that allows air to be driven out of the second chamber 116, 216, 316. As indicated above, the present invention is not limited to any particular number of volume reduction stages. The third capillary valve 324 of the third stage 312 is in fluid communication with the analysis chamber 52.

An example of how a cartridge 28 including one or more volume reduction stages may be utilized is as follows. A biologic fluid sample (e.g., a whole blood sample) is deposited in the collection port 58. The sample is drawn into the initial channel 60 by capillary action. A bolus of the sample travels within the initial channel 60 until the sample encounters the intersection between the initial channel 60 and the secondary channel 62. The sample bolus residing in the initial channel 60 may then be mixed and/or manipulated according to the methods and processes described in U.S. patent application Ser. No. 13/177,476, entitled "Biologic Fluid Analysis System with Sample Motion", which is hereby incorporated by reference in its entirety. The sample bolus residing in the initial channel 60 is then moved (e.g., actuated by air pressure) to the secondary channel 62. Once the sample bolus is located within the secondary channel 62, it may again be mixed and/or manipulated using the methodology and apparatus described in the aforesaid patent application. The sample bolus is subsequently positioned within the secondary channel 62 in alignment with a fluid passage 66 connecting to the initial chamber 114 of the first volume reduction stage 112. A volume of sample transfers (e.g., via capillary force, actuation force, etc.) into the initial chamber 114.

The initial chamber 114 of the first volume reduction stage 112 substantially fills with a volume of sample from the secondary channel (e.g., 10 µl). The sample is subsequently drawn into the second chamber 116 by capillary force until the second chamber is substantially full. The capillary forces acting on the sample within the second chamber 116 are not enough to drive the sample through the first capillary valve 120 disposed in the second chamber 116; i.e., the burst pressure of the first capillary valve 120 is greater than the fluid pressure at the valve 120, which pressure is generated by the capillary forces. The first capillary valve 120 does, however, allow gas to exit the second chamber 116 as the sample is drawn into the chamber. Until the second chamber 116 fills with sample, none of the sample exiting the initial chamber 114 will pass through the second capillary valve 122 and into the third chamber 118. The sample liquid enters the second chamber 116 first because it encounters less flow resistance entering the second chamber 116 than it does when it encounters the second capillary valve 120. Once the second chamber 116 fills, however, the path of least resistance for the flow is to travel through the second capillary valve 122 and into the third chamber 118 because the burst pressure of the secondary capillary valve 122 is less than the burst pressure of the first capillary valve 120. The sample volume drawn into the initial chamber 114 is consequently split between the second chamber 116 and the third chamber 118. In the example given above, the third chamber 118 holds a volume of 2.5 µl from the initial 10 µl.

The sample within the third chamber 118 of the first volume reduction stage 112 is subsequently drawn through the third capillary valve 124 and into the initial chamber 214 of the second volume reduction stage 212 and the above described flow process and consequent sample volume reduction repeats itself. Within the second volume reduction stage 212, the initial sample volume of 2.5 µl from the first reduction stage 112 is reduced to 0.8 µl. The 0.8 µl is subsequently passed from the third capillary valve 224 of the second reduction stage to the initial chamber of the third reduction stage where the volume reduction process repeats itself again. Finally, 0.4 µl of volume passes from the third capillary valve 324 of the third volume reduction stage 312 to the analysis chamber 52 where the sample can be imaged for analysis utilizing an analysis device 30 as described above.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A device for volumetric metering a liquid biologic sample, comprising:
   an initial chamber configured so that liquid sample disposed in the chamber is subject to capillary forces, which initial chamber has a volume;
   a second chamber in fluid communication with the initial chamber, which second chamber has a volume, and is configured so that liquid sample disposed in the chamber is subject to capillary forces;
   a third chamber in fluid communication with the initial chamber, which third chamber has a volume, configured so that liquid sample disposed in the chamber is subject to capillary forces;
   a first valve having a first burst pressure, which first valve is in fluid communication with the second chamber;
   a second valve having a second burst pressure, disposed between, and in fluid communication with, the initial chamber and the third chamber; and
   a third valve, having a third burst pressure, in fluid communication with the third chamber;

wherein the first burst pressure is greater than the second burst pressure or the third burst pressure.

2. The device of claim 1, wherein the first valve is operable to vent gas from the second chamber.

3. The device of claim 1, wherein the volume of the initial chamber is substantially equal to the combined volumes of the second chamber and the third chamber.

4. The device of claim 1, wherein the volume of the third chamber is less than the volume of the second chamber.

5. The device of claim 1, wherein the second chamber is configured such that liquid sample disposed in the second chamber is subjected to greater capillary forces than liquid sample disposed in the initial chamber.

6. The device of claim 5, wherein the third chamber is configured such that liquid sample disposed in the third chamber is subjected to greater capillary forces than liquid sample disposed in the second chamber.

7. The device of claim 1, wherein the second burst pressure is greater than the third burst pressure.

8. An analysis cartridge for a liquid biologic sample, comprising:
   a collection port;
   an analysis chamber; and
   at least one volume reduction stage, which stage includes an initial chamber configured so that liquid sample disposed in the chamber is subject to capillary forces, which initial chamber has a volume, and a second chamber in fluid communication with the initial chamber, which second chamber has a volume, and is configured so that liquid sample disposed in the chamber is subject to capillary forces, and a third chamber in fluid communication with the initial chamber, which third chamber has a volume, configured so that liquid sample disposed in the chamber is subject to capillary forces, and a first valve having a first burst pressure, which first valve is in fluid communication with the second chamber, and a second valve having a second burst pressure, disposed between, and in fluid communication with, the initial chamber and the third chamber, and a third valve, having a third burst pressure, in fluid communication with the third chamber, and wherein the first burst pressure is greater than the second burst pressure or the third burst pressure;
   wherein the at least one volume reduction stage is in fluid communication with the collection port and the analysis chamber, and the stage is disposed such that sample entering the cartridge through the collection port passes through the volume reduction stage, and exits the third valve prior to entering the analysis chamber.

9. The cartridge of claim 8, wherein the first valve is operable to vent gas from the second chamber.

10. The cartridge of claim 8, wherein the volume of the initial chamber is substantially equal to the combined volumes of the second chamber and the third chamber.

11. The cartridge of claim 8, wherein the volume of the third chamber is less than the volume of the second chamber.

12. The cartridge of claim 8, wherein the second chamber is configured such that liquid sample disposed in the second chamber is subjected to greater capillary forces than liquid sample disposed in the initial chamber.

13. The cartridge of claim 12, wherein the third chamber is configured such that liquid sample disposed in the third chamber is subjected to greater capillary forces than liquid sample disposed in the second chamber.

14. The cartridge of claim 8, wherein the second burst pressure is greater than the third burst pressure.

15. The cartridge of claim 10, wherein the analysis chamber is formed between a base plate and an upper chamber panel.

* * * * *